United States Patent Office 2,856,445
Patented Oct. 14, 1958

2,856,445

POLYMERIZATION OF OLEFINS

Hans Bohlbro, Copenhagen, Denmark, assignor to Esso Research and Engineering Company, a corporation of Delaware No Drawing. Application February 24, 1954
Serial No. 412,369

Claims priority, application Great Britain March 31, 1953

6 Claims. (Cl. 260—683.15)

The present invention relates to the catalytic polymerization of olefins in the vapor phase and relates more particularly to the low pressure polymerization of normally gaseous olefins to form liquid products boiling in the gasoline range.

In the refining of petroleum oils large quantities of hydrocarbon gases are produced, e. g. by cracking processes, which contain substantial amounts of olefins. In general the olefins are predominantly propylene and butylenes and by their controlled polymerization there may be produced higher olefins boiling in the gasoline range. Such polymers may be used as such or after hydrogenation as a high octane gasoline blending stock.

Several methods are known for effecting such polymerization, both catalytic and non-catalytic. The non-catalytic processes operate under elevated temperatures and pressures of the order of 1,000 lbs./sq. in. Many different catalysts have been proposed for use in the catalytic processes ranging from adsorbents such as activated clay, through mineral acids such as phosphoric and sulfuric acids to Friedel-Crafts type catalysts exemplified by the halides of aluminum and boron. The most commonly used catalysts for the so-called non-selective polymerization of unsaturated refinery gases to gasoline products are of the phosphoric acid type. The Friedel-Crafts catalysts are more active in their action and are used mainly for polymerization to higher products in the lubricating oil range, with or without simultaneous alkylation or arylation of the product.

In general such polymerization reactions are carried out in so-called liquid phase and, therefore, under a suitably high pressure, the maintenance of which adds significantly to the cost of the process.

It is an object of the present invention to provide a process whereby high yields of hydrocarbons boiling in the gasoline range may be produced by catalytic polymerization of normally gaseous olefins in the vapor phase and at relatively low temperatures and pressures.

The halides of boron, notably boron fluoride, are intrinsically attractive catalysts for such a process, but possess marked disadvantages arising from the fact that they are gases. Thus it is necessary to inject the catalyst in the gaseous state into the reaction zone which complicates control of the reaction to give optimum yields of products boiling in the desired range. Furthermore, excess catalyst is carried out with the liquid product which means that either polymerization will continue to give undesirable higher polymers, or that the excess catalyst must be hydrolyzed to make it inactive with consequent waste.

It is accordingly a further object of the invention to provide an improved boron halide catalyst and polymerization process employing it, whereby good yields of gasoline hydrocarbons may be obtained form normally gaseous olefins with a low consumption of catalyst and simplified reaction control.

The reaction conditions of the process of the present invention involve temperatures of from 0° C. to 200° C. or 300° C. and pressures sufficiently low to maintain the reactant olefins in vapor phase. In general the temperature will be chosen so as to give optimum results relative to catalyst activity (percent conversion) on the one hand and catalyst stability on the other. At higher temperatures such as those above 150° C. there is a tendency for the catalyst to evaporate unduly rapidly. The reaction pressure is dictated largely by the source of the olefin feed and the maintenance of vapor phase operation. This, of course, means that the olefin gases are in vapour phase while the gasoline product is in the liquid phase. The process works well at atmospheric pressure, but higher pressures, e. g. up to 10 atmospheres or even more, may be used, especially when the olefins come from a source in which they are already under a substantial pressure, e. g. a refinery $C_4$ cut. In such cases there is obviously no point in reducing the pressure to atmospheric, while equally when the gases are delivered at atmospheric pressure there is little point in compressing them excessively. In general the selection of a suitable reaction pressure will be a matter of common sense, bearing in mind that the lower the pressure the lower will be the volumetric efficiency of the reactor, and the higher the pressure the greater will be the investment cost of the plant.

As already stated the preferred feed olefins are cracked refinery gases which will normally contain propylene and mixed butylenes, together with some propane and butanes. For special purposes purified feeds may be used, e. g. propylene or isobutylene alone. Also the presence of ethylene in the feed is not disadvantageous.

It has now been found, according to the present invention, that certain complexes of metal fluorides with boron trifluoride are effective catalysts for polymerization reactions of the above type.

The property of metal fluorides to absorb boron trifluoride and the properties of the resulting fluorides vary with the metal concerned. Thus alkali metal fluorides absorb boron trifluoride readily and the resulting complex is very stable and consequently rather inert. On the other hand nickel fluoride forms a complex that is relatively unstable. Complexes having catalytic activity can be formed with alkaline earth metal fluorides and iron group metal fluorides, e. g., iron and nickel fluorides, however it is generally preferred to use alkaline earth metal fluorides such as calcium fluoride. As is brought out hereinafter, it is essential for the catalyst to be effective that the metal fluoride component of the catalyst complex contain water of hydration.

The actual composition of the complexes that comprise the catalysts of this invention is uncertain. It is probable that, for example with $CaF_2$, $Ca(BF_4)_2$ is formed on the surface of the crystals. The superior catalytic properties of the complex compared to precipitated $Ca(BF_4)_2$ are presumed to arise from the fact that the complexes may be presumed to have a more distorted crystal lattice.

The adsorption properties of the metal fluorides with boron trifluoride are interesting. A sample of pure, finely divided precipitated $CaF_2$ containing 1.8% water adsorbed 41 gm. $BF_3$ per 100 gm. $CaF_2$ at room temperature and atmospheric pressure. However the same sample, when dried, only absorbed 7.5 gm. $BF_3$ per 100 gm. $CaF_2$. Thus it appears that a small amount of water is desirable to catalyze the reaction between the metal fluoride and $BF_3$. A further interesting feature of the absorption is that it strengthens pellets of the metal fluoride.

The features of the invention may more readily be seen from the following examples.

A catalyst was made from 100 gm. $CaF_2$ (containing 1.8 gm. $H_2O$) pelletted and with 15.2 gm. $BF_3$ absorbed. A gas comprising 19.1% isobutene, 40.9% n-butene and 40% n-butane was passed over the catalyst at a space velocity of 100 v./v./hr. at atmospheric pressure. The product yield was determined as the volume of gas disappeared in percent of the olefin content of the feed gas. At 20° C. the yield was 0%. On raising the temperature to 150° C. the yield increased from 8 to 20% over 20 hours. The temperature was then raised to 175° and the yield increased to about 70% from which value it slowly fell to 30% over about 140 hours, thence rapidly decreasing to 0%. The catalyst was not regenerable by heating to 300° C. for 24 hours in an air stream. It is believed that the loss of efficacy of the catalyst was due to loss of boron trifluoride. The composition of the product varied during the run. Distillation of the product yielded 75% gasoline in the distillate in the 24-45 hour period and 67½% in the period 70-95 hours.

A second experiment was performed with a similar catalyst comprising 15.8 gm. $BF_3$ per 100 gm. $CaF_2$. The conditions were, with the exception of temperature, similar to the above example, The run was started at 175° C. with a yield of about 70%. There was an initial rapid decrease in activity, probably due to initial adsorption of hydrocarbons until the catalyst is saturated, thereafter the yield increased to 71%. After about 26 hours the temperature was raised to 200° C. and the yield rapidly increased to 122% and then slowly falls off to 59% after 70 hours. The decrease in activity is more rapid at 200° than at 175° C. The distillation of the product yield between 26 and 46 hours, corresponding to the very high yield, gave 41% gasoline showing that the selectivity to gasoline is less at higher yield.

A third experiment under similar conditions with a similar catalyst comprising 44.3 gm. $BF_3$ per 100 gm. $CaF_2$ was run with a feed gas comprising 17.1% isobutene, 42.8% n-butene, 40.1% n-butane. The run lasted 580 hours (24 days) before the catalyst became inactive. The run was started at 50% C. at which temperature the yield decreased from 95% to 18% during 46 hours, the temperature was then raised to 75° C., 100° C., 125° C. and 150° C. successively; not until 150° C. was there a considerable increase in yield. At 150° C. the yield stayed almost constant at 65-70% for about 120 hours. At 314 hours the yield had decreased to 20% and the temperature was increased to 175° C. and the yield increased to 65-70%. At 480 hours the yield had again decreased to 20% and the temperature was increased to 200°; the yield again increased to 65-70%. During the last 25 hours the temperature was gradually raised to 300° C. while the yield steadily decreased. The total amount of product produced by the 20 gm. catalyst (containing 6.1 gm. $BF_3$) was 857 gm. which corresponds to an average yield of 55%, based on the olefin content of the feed gas. The catalyst was analysed after the run and found to contain 0.7 gm. $BF_3$ per 100 gm. $CaF_2$.

An experiment was performed using a complex of iron fluoride and boron trifluoride. The iron fluoride used was $FeF_3.3H_2O$ which absorbs $BF_3$ readily. Attempts to prepare anhydrous fluoride were unsuccessful since the compound was partly decomposed to HF and $Fe_2O_3$ and the product did not absorb $BF_3$. The catalyst comprised 68 gm. $BF_3$ per 100 gm. $FeF_3.3H_2O$. The conditions were similar to the above examples. The yield was very high at the start (about 120%) and gradually decreased during 218 hours to 22%. The temperature was raised stepwise and the following yields obtained.

TABLE I

Yield on $FeF_3.3H_2O/BF_3$ Catalyst

| Temperature, ° C. | Time Interval, Hours | Yield, percent |
|---|---|---|
| 20 | 0-22 | 112 |
| 20 | 22-218 | 60 |
| 50 | 218-242 | 36 |
| 100 | 242-290 | 51 |
| 150 | 290-362 | 32 |
| 200 | 362-393 | 45 |

The higher yield at room temperature is probably due to the very unstable $BF_3$-water complexes. It is interesting that the yield at 250° C. is quite stable although low (about 20%).

$NiF_2.4H_2O$ absorbed 7.3 gm. $BF_3$ per 100 gm. $NiF_2$ whereas when 3.6 moles of water were driven off (at which stage HF was evolved) 9.0 gm. $BF_3$ per 100 gm. $NiF_2$, 0.4 $H_2O$ was absorbed. This is in contrast to the effect observed with $FeF_3.3H_2O$. A run using the dehydrated catalyst was started at room temperature when the yield decreased from 100% to 15% over 68 hours. The temperature was then raised gradually over 4 hours to 115° C. at which temperature the yield increased to approximately 47% and thereafter decreased to 10% during 20 hours. Thereafter the temperature was raised to 250° C. over 26 hours with no significant yield.

NaF was found readily to absorb 19.5 gm. $BF_3$ per 100 gm. NaF but the product exhibited no catalytic activity.

It is believed that the catalytic effect is partly heterogeneous and partly homogeneous, the latter being occasioned by omission of $BF_3$ from the catalytic complex. It will be noted that the words absorbed and adsorbed are used more or less indiscriminantly in the above specification; in fact, it is not clear which phenomenon is involved.

Various modifications of the operating technique described may be incorporated, particularly when operating on the plant scale as will be clear to those skilled in the art. Thus, for example, the gases may be passed through a bed of catalyst complex, while supplementary complex is added to the catalyst bed. Spent catalyst complex is withdrawn to storage where additional $BF_3$ may be added if necessary before it is recycled to the reactor.

In an alternative embodiment a guard bed of $BF_3$ unimpregnated fluoride may be maintained on the outlet side of the catalyst bed so that the $BF_3$ lost from the active part of the bed is reabsorbed in the inert part. When the bulk of the $BF_3$ has been transferred from the active to the inactive part of the bed, the direction of flow of the feed gases may be reversed, with the result that in due course the catalyst will be retransferred back to the original active portion. Supplementary make-up $BF_3$ may, of course, be added as well to compensate for any absolute loss.

Thus, to summarize, the present invention provides an improved process for the vapour phase polymerization of normally gaseous olefins to products boiling in the gasoline range in which metal fluoride/boron trifluoride complexes are employed as catalyst.

What I claim is:

1. A process for converting normally gaseous olefins to liquid polymers boiling in the gasoline range which comprises contacting said olefins in the vapor phase at temperatures in the range of about 0° to about 300° C. with a catalyst comprising a complex of boron trifluoride and a metal fluoride selected from the group consisting of alkaline earth metal fluorides and iron group fluorides, said metal fluoride containing water of hydration.

2. The process of claim 1 wherein the metal fluoride is an alkaline earth fluoride.

3. The process of claim 1 wherein polymerization is effected at a pressure in the range of between atmospheric and 10 atmospheres.

4. The process of claim 1 wherein the feed olefins comprise cracked refinery gases.

5. The process of claim 2 wherein said complex comprises calcium fluoride.

6. The process of claim 5 wherein said complex comprises 5 to 50 grams of boron fluoride per 100 grams of calcium fluoride.

References Cited in the file of this patent

UNITED STATES PATENTS

| | | |
|---|---|---|
| 1,989,425 | Otto et al. | Jan. 29, 1935 |
| 2,142,980 | Huijser et al. | Jan. 3, 1939 |
| 2,217,019 | Ipatieff et al. | Oct. 8, 1940 |
| 2,416,106 | Linn | Feb. 18, 1947 |

OTHER REFERENCES

Simons: "Fluorine Chemistry," pages 247–248, published by Academic Press Inc., 1950.